United States Patent [19]
Chiodini et al.

[11] Patent Number: 5,936,961
[45] Date of Patent: Aug. 10, 1999

[54] SIGNALLING PACKET FOR COMMUNICATION SYSTEM WITH REFERENCE MODULATED IN ACCORDANCE WITH A TIME-DEPENDENT LAW

[75] Inventors: Alain Chiodini, Boulogne; Vinod Kumar; Jean-Marc Thienpont, both of Paris, all of France

[73] Assignee: Alcatel Mobile Phones, Paris, France

[21] Appl. No.: 08/557,101

[22] PCT Filed: Jun. 7, 1994

[86] PCT No.: PCT/FR94/00670

§ 371 Date: Feb. 6, 1996

§ 102(e) Date: Feb. 6, 1996

[87] PCT Pub. No.: WO94/29971

PCT Pub. Date: Dec. 22, 1994

[30] Foreign Application Priority Data

Jun. 7, 1993 [FR] France ................................. 93/06791
Jun. 7, 1993 [FR] France ................................. 93/06792

[51] Int. Cl.⁶ .................................................. H04J 3/16
[52] U.S. Cl. ........................................ 370/441; 370/527
[58] Field of Search .................................. 370/441, 310,
370/312, 321, 324, 344, 343, 350, 207,
491, 500, 289, 389, 206, 203, 212, 213,
215, 320, 319, 329, 335, 337, 336, 341,
342, 347, 442, 522, 524, 527, 529, 503,
480; 375/261, 298, 340, 364, 260, 244,
200, 239, 289, 356, 359; 379/410; 455/71,
13.2, 37.1, 38.1, 42, 502, 524, 517, 516,
68, 69, 70, 86, 87

[56] References Cited

U.S. PATENT DOCUMENTS

| | | | |
|---|---|---|---|
| 4,019,138 | 4/1977 | Watanabe et al. | 455/13.2 |
| 5,095,538 | 3/1992 | Durboraw, III | 455/71 |
| 5,166,924 | 11/1992 | Moose | 370/291 |
| 5,272,446 | 12/1993 | Chalmers et al. | 375/329 |
| 5,519,730 | 5/1996 | Jasper et al. | 370/500 |

FOREIGN PATENT DOCUMENTS

| | | |
|---|---|---|
| 0305814A2 | 3/1989 | European Pat. Off. |
| 0337267A3 | 10/1989 | European Pat. Off. |
| 2683689A1 | 5/1993 | France |

OTHER PUBLICATIONS

R. E. Buck et al, "Matched Filter Doppler Acquisition System", *IBM Technical Disclosure Bulletin*, vol. 6, No. 11, Apr. 1964, New–York, US; p. 32.

*Primary Examiner*—Dang Ton
*Attorney, Agent, or Firm*—Sughrue, Mion, Zinn, Macpeak & Seas, PLLC

[57] ABSTRACT

A signalling packet for a communication system has a reference signal to support time and frequency synchronization. The reference signal is modulated so that it varies with time according to a predetermined modulation law. The variation is with respect to both the I and Q channels. Because of the variation with time, receivers can synchronize in frequency and in time with a base station in a simplified manner. Doppler shift can be determined and compensated.

43 Claims, 8 Drawing Sheets

SIGNALLING PACKET FOR COMMUNICATION SYSTEM WITH REFERENCE MODULATED IN ACCORDANCE WITH A TIME-DEPENDENT LAW

BACKGROUND OF THE INVENTION

The present invention concerns a signalling packet for a communication system.

In communication systems, for example the GSM pan-European digital cellular mobile radio system, a terminal and a base station communicate by means of communication channels carrying radio signals. Systems of this kind include a plurality of channels for transmission from the terminals to the base stations or for transmission from the base stations to the terminals.

These channels include a control channel that is transmitted continuously and that enables a terminal to access a system via the base station transmitting this channel in order to set up calls. The terminal must therefore identify this control channel in order to acquire the information enabling it to declare itself within the system. This information includes synchronization information and this procedure is usually therefore called the synchronization procedure.

In the solution generally adopted the synchronization procedure is carried out in two stages. Initially the terminal measures the power of all the receive channels. The terminal then attempts to synchronize to the channel it receives at the highest power; if it fails to do this, it tries the other channels in decreasing received power order, until it is eventually able to synchronize. This solution is that set out in GSM Recommendations 4.08 and 5.08.

The synchronization procedure is executed systematically when the terminal is switched on and, more generally, after any loss of synchronization, i.e. if the radio link carried by the control channel between the base station and the terminal is interrupted. This may be intentional, for example if the terminal is switched off, or unintentional. The terminal may be temporarily unable to synchronize because radio reception conditions are inadequate. This occurs in a tunnel, for example, or more generally when it is in a shadow area in the radio sense of this term.

Synchronization usually comprises two phases. The first or frequency synchronization phase consists in acquiring the frequency reference of the base station. The second or time synchronization phase consists in acquiring the time reference of the base station.

To this end, in the GSM system the control channel BCCH includes two sub-channels, namely a frequency control sub-channel FCH for the frequency synchronization and a synchronization sub-channel SCH for the time synchronization.

The frequency control sub-channel is in the form of a packet corresponding to a pure sinusoid transmitted at regular time intervals. The terminal must therefore look for this packet for a time period that substantially corresponds to the packet repetition period.

Because of the nature of the packet and the means employed to detect it, it is not possible to determine its start or its duration, and it is therefore necessary to use the synchronization sub-channel to achieve the necessary time synchronization.

The synchronization sub-channel follows the frequency control sub-channel with a known time-delay. It comprises a sequence of symbols having a suitable autocorrelation function. The terminal knows this synchronization sequence and correlates this sequence with the sequence of symbols received. Because of the inaccuracy of the time reference of the base station, the terminal does not know with certainty which of the symbols received corresponds to the first symbol of the synchronization sequence and many correlations are therefore required, shifting one of the sequences relative to the other, in order to identify the correlation peak.

A first aim of the invention is therefore to improve the performance of the synchronization procedure.

In most radio communication systems the radio signal transmission subsystem includes an element that is mobile. As a result, the frequency of the radio signal is modified because of the Doppler effect.

A Doppler shift naturally occurs in the GSM system if the terminal is moving, and its value is directly proportional to the speed of the terminal. Although it is relatively easy to detect the pure sinusoid of the frequency control sub-channel when the latter has a known frequency, for example using a selective filter, this is no longer so if the frequency is modified by an unknown Doppler shift. A filter is then required with a bandwidth that allows for the maximum Doppler shift in both directions, which seriously degrades the performance of the filter.

What is more, the frequency shift is much greater in systems using non-geostationary satellites, as in the Globalstar system in particular.

A system of this kind uses a satellite in low Earth orbit, for example at an altitude of 1 390 kilometers, travelling at a speed of for example around 7.2 kilometers per second, as a relay station between the terminal and the base station.

The satellite receives the radio signal from the base station and retransmits it to the terminal. The satellite simply acts as a "mirror": it transmits the signal it receives from the base station without modification, or at most after transposing its frequency.

The frequency shift depends on the speed and on the position of the satellite relative to the terminal, which can itself be regarded as fixed.

It is clear that this frequency shift must be corrected.

Another aim of the invention is therefore to provide means for correcting the frequency shift due to the Doppler effect.

In radio communication systems the communication channels proper are often transmitted as follows:

A transmitter transmits a sequence of symbols to a receiver on a transmission channel. The sequence transmitted is degraded in the transmission channel with the result that the sequence of symbols received by the receiver is not identical to it. The main deterioration is intersymbol interference due to the fact that a symbol can take different paths in the transmission channel. If at least two paths have a path difference greater than the distance between two symbols transmitted successively, a symbol taking one of these paths will interfere with a subsequent symbol taking another, shorter path.

An equalizer is used in the receiver to correct the intersymbol interference. To operate correctly, the equalizer must know the impulse response of the transmission channel. To this end, known symbols are transmitted in a training sequence. The training sequence is chosen to suit the characteristics of the transmission channel and in particular its length.

Given that the symbols are transmitted regularly, with a period called the symbol period, the length of the channel is defined as the number of symbol periods that is equivalent to the difference between the longest path and the shortest path of the channel.

A channel estimator device is used in the receiver to establish the impulse response of the channel. It generates a replica of the training sequence and correlates it with the sequence of symbols received. The result is a set of coefficients $h_i$ in which i varies from 0 to L, where L is the length of the channel, this set of coefficients providing information used by the equalizer. The most direct path on the channel is represented by ho and the other coefficients represent longer paths that interfere with it.

It is clear that the channel cannot be estimated until synchronization has been acquired. Moreover, a special packet, namely the training sequence, must be provided for this purpose.

A third aim of the invention is therefore to provide channel estimation means.

To summarize, in any communication system many signalling signals are required to set up a call. In the present context the term "synchronization" is to be understood in the most general sense and in particular it covers synchronization information, information needed to correct the Doppler shift and information that is used to estimate the transmission channel.

SUMMARY OF THE INVENTION

An object of the present invention is to simplify the processing of these signals.

To this end there is provided a signalling packet for a communication system which includes a reference signal modulated according to a modulation law that is a predetermined function of time within the packet.

Moreover, the reference signal is frequency modulated. Additionally, the modulation law is a linear function of time.

To be more precise, if the modulation law is applied to two channels in quadrature, two distinct functions can be provided on each channel.

This produces a reference signal that intrinsically includes information from which the transmission time of any point within the signal can be recovered.

A first application is to a device for estimating the Doppler shift of a carrier conveying a signalling packet of this kind, comprising:
    a local oscillator,
    a mixer receiving the carrier and the output signal of the local oscillator,
    a filter receiving the output signal of the mixer and producing an intermediate frequency signal,
    an analyzer circuit receiving the intermediate frequency signal and producing a shift signal representing the frequency shift due to the Doppler effect between a theoretical frequency and the intermediate frequency signal frequency,
    a control circuit controlling the local oscillator to establish an estimate of the Doppler shift from the shift signal.
In this device, the control circuit controls the local oscillator to reduce the frequency shift.

In a first embodiment of the device the analyzer circuit includes at least a first filter tuned to the reference signal and centered on the theoretical frequency and a correction circuit for producing a first form factor of the output signal of the filter and the control circuit controls the local oscillator to maximize the first form factor.

The control circuit controls the local oscillator by successive approximation, applying a frequency correction on either side of the frequency that produces the greatest form factor in order to search again for the greatest form factor, successive searches being conducted with a reducing value of the frequency correction as far as a predetermined correction threshold.

Alternatively, a shift amplitude being substantially equal to the maximum Doppler shift of the intermediate frequency signal, the device further comprises second and third filters tuned to the reference signal and centered on the theoretical frequency respectively decreased by and increased by the amplitude of the shift, the correction circuit establishing, in addition to the first form factor, second and third form factors of the output signal of the second and third filters, respectively, and producing the shift signal proportional to the opposite of the barycenter of the center frequencies of the filters weighted by the corresponding form factors.

The control circuit may control the local oscillator so that the intermediate frequency signal has a frequency increased by the frequency of the shift signal.

A second application is to a device for synchronizing to a carrier conveying a signalling packet of this kind, the reference signal having a duration T and being transmitted periodically with a repetition period $T_r$, a measurement period having a predetermined duration greater than or equal to $T+T_r$, this device comprising:
    a local oscillator,
    a mixer receiving the carrier and the output signal of the local oscillator,
    a filter receiving the output signal of the mixer and producing an intermediate frequency signal,
    an analyzer circuit receiving the intermediate frequency signal and producing a change frequency signal if the reference signal is not detected and a frequency shift signal representing the difference between a theoretical frequency and the frequency of the intermediate frequency signal,
    a control circuit controlling the local oscillator so that it tunes to the carrier and then, after a measurement period, either tunes to another carrier in the presence of the change frequency signal or reduces the value of the frequency shift signal in the absence of the change frequency signal.

The analyzer circuit comprises at least a first filter tuned to the reference signal and centered on the theoretical frequency and a correction circuit to produce a first form factor of the output signal of this filter and the control circuit controls the local oscillator to maximize the first form factor.

The control circuit controls the local oscillator by successive approximation, applying a frequency correction on either side of the frequency that produces the greatest form factor in order to search again for the greatest form factor, the successive searches being effected with a reducing value of the frequency correction as far as a predetermined correction threshold.

In one embodiment of the synchronization device, the reference signal being transmitted periodically with a repetition period $T_r$, this device comprises:
    a local oscillator,
    a mixer receiving the carrier and the output signal of the local oscillator,
    a filter receiving the output signal of the mixer and producing an intermediate frequency signal,
    an analyzer circuit receiving the intermediate frequency signal and producing a frequency shift signal representing the time interval between reception of two successive signalling packets, a control circuit controlling the local oscillator to reduce the shift between the frequency shift signal and the repetition period $T_r$.

A third application is to a device for estimating a transmission channel by means of a carrier conveying a signalling packet of this kind, comprising:

a local oscillator, a mixer receiving the carrier and the output signal of the local oscillator, a filter receiving the output signal of the mixer and producing an intermediate frequency signal, an analyzer circuit receiving the intermediate frequency signal and transposing it into the baseband to produce a spectrum of the channel, a control circuit controlling the local oscillator to establish an estimate of the channel from the channel spectrum.

The reference signal having a frequency of constant slope $-\mu$, the control device controls the local oscillator so that it produces a frequency with a slope $\mu$ which is the opposite of that of the reference signal, starting from reception of that signal via the shortest path $t_0$ of the channel, the channel spectrum having a set of lines each identified by its frequency $r_i$ and its amplitude $h_i$, a particular line corresponding to a path $t_i$ and having a frequency related to the length of that path, the control circuit producing this estimate by characterizing each path $t_i$ by its contribution, which is proportional to the amplitude of the corresponding line $h_i$, and by its time-delay $\tau_r$ which has the value $(r-r_0)/\mu$, for all values of i between 0 and n if (n+1) separate paths are taken into consideration.

BRIEF DESCRIPTION OF THE DRAWINGS

The invention will now emerge in more detail from the following description of embodiments of the invention given with reference to the appended drawings, in which.

DETAILED DESCRIPTION OF THE PREFERRED EMBODIMENTS

Figure 1:
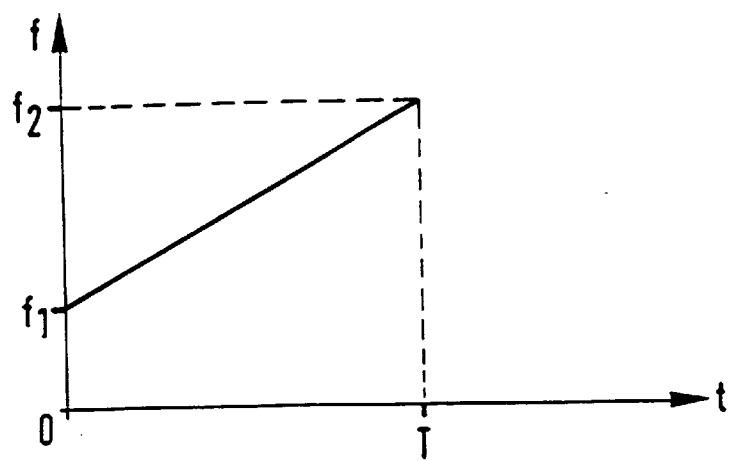
FIG. 1 shows one example of a reference signal in accordance with the invention.

First of all, the signalling packet with which the invention is concerned is defined with reference to FIG. 1. A packet is defined as the support of a signal during a particular time T. In the present instance this signal, the reference signal, has a frequency that varies as a linear function of time. Taking the packet start as the time origin t, the instantaneous frequency f of this signal can be represented by the following expression:

$$f = \left(\frac{f_2 - f_1}{T}\right) \cdot t + f_1$$

The signal is assumed to be of constant amplitude and it can naturally be an analog signal or a digital signal.

The packet is transmitted on a carrier C, as is usual in transmission systems.

The signalling packet lends itself with advantage to estimation and correction of the Doppler shift to which the carrier is subject, and this application will now be described.

Figure 2:
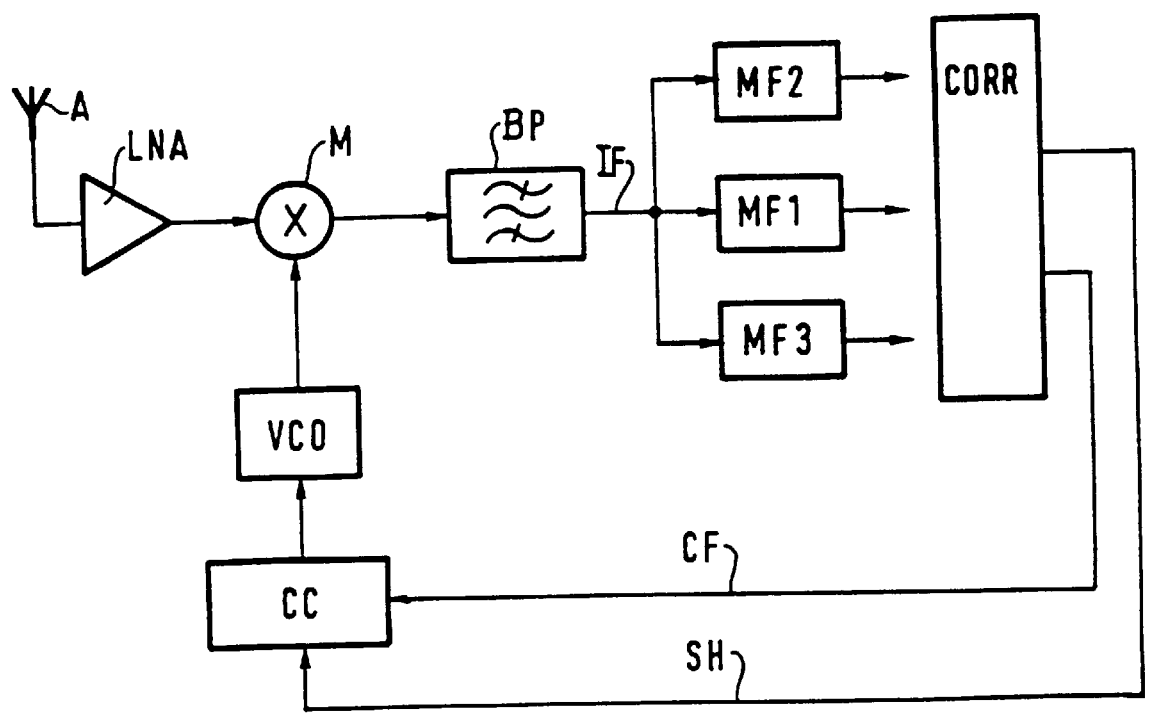
FIG. 2 is a diagram showing the components necessary for implementation of a device applying the invention.

FIG. 2 shows the components of one embodiment of a receiver. In a manner that is known in itself, the receiver comprises an antenna A for receiving the carrier. This antenna is followed by an amplifier, usually a low-noise amplifier LNA.

The receiver also comprises a mixer M which receives the output signal of the amplifier LNA and the output signal of a local oscillator, for example a voltage-controlled oscillator VCO. This oscillator is controlled by a control circuit CC the function of which is explained below. The output of the mixer is connected to a bandpass filter BP which produces an intermediate frequency signal IF at its output. The bandpass filter meets the usual criteria of sideband rejection and phase distortion. Its center frequency and its bandwidth are defined below.

The receiver is designed to operate at a particular intermediate frequency called the theoretical frequency $f_T$ which corresponds to the situation in which there is no Doppler shift.

Assume now that the carrier is subject to the Doppler effect: the frequency of the intermediate frequency signal varies between $f_T-\Delta f$ and $f_T+\Delta f$ where $\Delta f$ represents the amplitude of the Doppler shift, for a control voltage of the local oscillator VCO that should produce a frequency equal to $f_T$. Consequently, the center frequency of the bandpass filter BP is made equal to $f_T$ and its bandwidth is made equal to that of the signal increased by $2.\Delta f$.

In accordance with the invention, the receiver comprises three filters tuned to the reference signal:

the first MF1 centered on the theoretical frequency $f_T$, the second MF2 centered on the theoretical frequency $f_T$ minus the amplitude of the Doppler shift, i.e. $f_T-\Delta f$, the third MF3 centered on the theoretical frequency $f_T$ plus the amplitude of the Doppler shift, i.e. $f_T+\Delta f$.

These tuned filters can be surface acoustic wave filters, for example.

Figure 3:
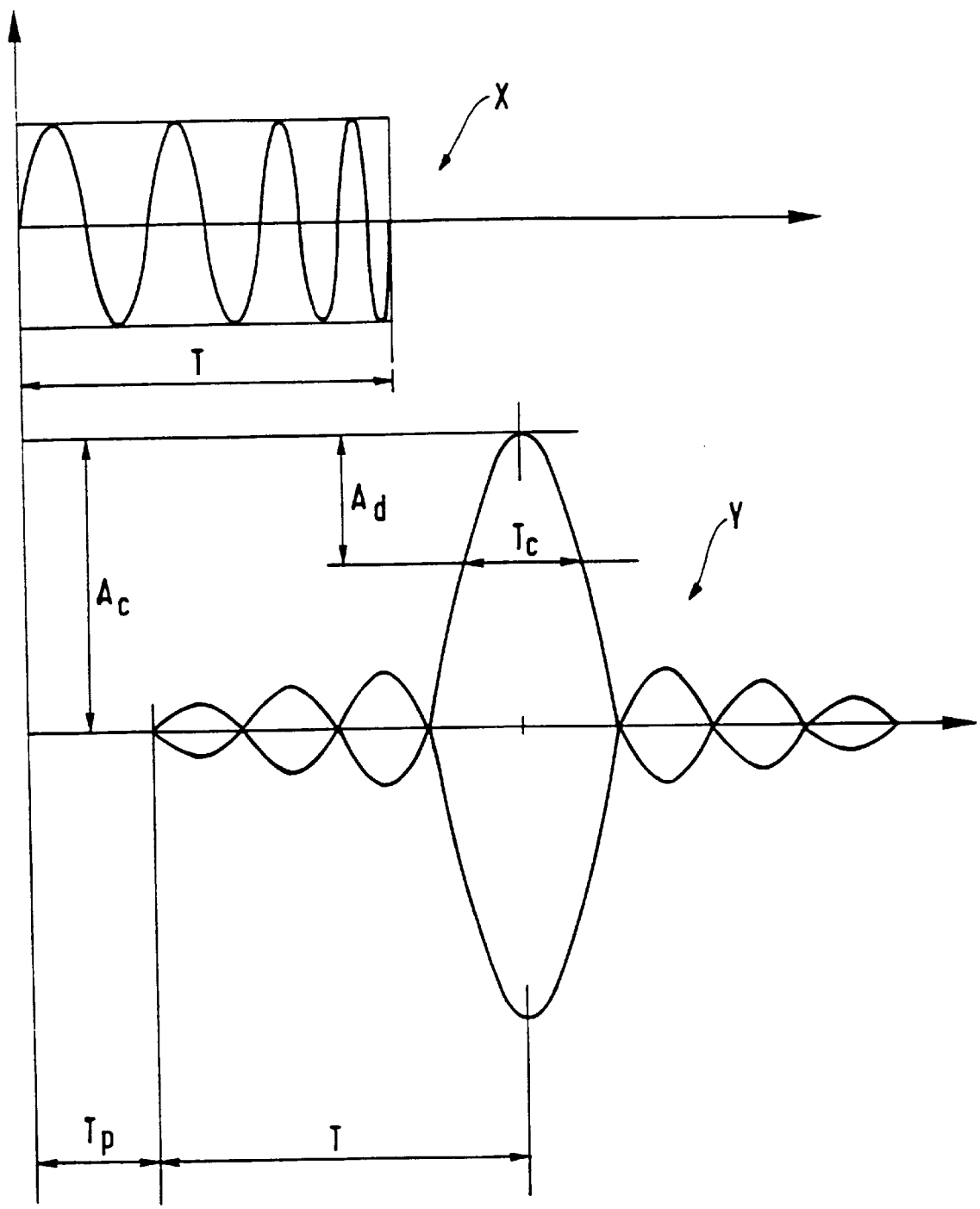
FIG. 3 shows the waveform of the input signal and the output signal of a tuned filter used in one embodiment of the invention.

FIG. 3 shows the input signal X and the envelope Y of the output signal of a filter of this kind using the same time scale.

This filter has a propagation time Tp and produces an output signal the waveform of which, familiar to the person skilled in the art, is a damped sin x/x function and which therefore has a main lobe with the peak value $A_c$ and the width of which, measured at an amplitude equal to the peak value $A_c$ less a predetermined value $A_d$ (20 dB, for example) is Tc.

A form factor W that characterizes the shape of the main lobe is determined. The peak value $A_c$ or the energy contained in this lobe or the width $T_c$ of this lobe could be chosen. Here, by way of example, the ratio of the peak value $A_c$ to the width $T_c$ has been chosen:

$W = A_c/T_c$

Each of the three tuned filters MF1, MF2, MF3 has a bandwidth such that an input signal corresponding to the reference signal but with the frequency shifted Af relative to its tuned frequency gives a form factor W having a value above a detection threshold $S_d$ so that the corresponding main lobe can be detected.

The receiver further comprises a correction circuit CORR shown in FIG. 2. This circuit receives the output signals of the first, second and third tuned filters MF1, MF2 and MF3 and calculates respective first, second and third form factors $W_1$, $W_2$ and $W_3$. A form factor whose value is below the detection threshold $S_d$ is forced to zero. If the first form factor $W_1$ is non-null, the circuit produces a change frequency signal CF that is sent to the control circuit CC, this signal being used in another application described in more detail below.

If the first form factor $W_1$ is non-null, the correction circuit CORR produces a shift signal SH, also sent to the control circuit, as follows:

$$SH = \frac{W_2 - W_3}{W_1 + W_2 + W_3} \cdot \Delta f$$

This is the opposite of the barycenter of the center frequencies of the tuned filters weighted by the corresponding form factors. A value proportional to this barycenter or any other value could be chosen provided that it represents the difference between the theoretical frequency $f_T$ and the frequency of the intermediate frequency signal.

Remember that the aim is to measure and to correct the Doppler shift of the carrier C, assumed to be the carrier conveying the signalling packet.

Remember also that the signalling packet of duration T is transmitted periodically with a repetition period $T_r$.

Accordingly, the control circuit CC controls the local oscillator VCO so that the intermediate frequency signal IF is at the frequency $f_T$ if the carrier is not subject to the Doppler effect. At the end of a measurement period of duration at least $T+T_r$, the correction circuit will necessarily have established that the first form factor $W_1$ is non-null since the first tuned filter is designed accordingly.

At the end of this first measurement period the control circuit receives the shift signal SH which here takes the value $D_1$. It then controls the local oscillator VCO so that it produces a frequency increased by $D_1$.

It then waits for a second measurement period to read the new value $D_2$ of the shift signal SH and again corrects the local oscillator VCO so that it produces a frequency increased by $D_2$. This procedure continues until after the nth measurement period the shift signal SH has the value $D_n$.

If $D_n$ is below a correction threshold $S_c$ that is deemed to be sufficient in the present application, for example 100 Hz, the Doppler shift is corrected and its value D is:

$$D = \sum_{i=1}^{n} D_i$$

So far three tuned filters have been used. In many cases the amplitude of the Doppler shift $\Delta f$ allows the use of a single tuned filter centered on the theoretical frequency $f_T$ and the bandwidth of which is chosen so that its form factor is above the detection threshold $S_d$ if the input signal corresponds to the reference signal shifted by $\pm \Delta f$.

In this case, the control circuit CC controls the local oscillator VCO so that the intermediate frequency signal IF is at the frequency $f_T$ if the carrier is not subject to the Doppler effect.

The correction circuit CORR now produces as the shift signal SH the form factor from the single tuned filter.

At the end of a first measurement period the value of the form factor is $W_{T0}$. The control circuit CC then controls the local oscillator VCO so that it reduces the intermediate frequency by $\Delta f/2$ and at the end of a second measurement period registers the value $W_{m0}$ of the form factor. The control circuit CC then controls the local oscillator VCO so that it increases the intermediate frequency by $\Delta f/2$ and at the end of a third measurement period registers the value $W_{M0}$.

It then determines which of the three values $W_{T0}$, $W_{m0}$, $W_{M0}$ is the greatest. It is denoted $W_{T1}$ and it is clear that the frequency $F_1$ that produced this value is that nearest the tuned frequency.

The control circuit CC next controls the local oscillator VCO so that it produces the intermediate frequency $F_1 - \Delta f/4$. At the end of a fourth measurement period it registers the value $W_{m1}$ of the shift signal. It then determines which of the three values $W_{T1}$, $W_{m1}$ and $W_{M1}$ is the greatest. It is denoted $W_{T2}$ and it is clear that the frequency $F_2$ that produced this value is that nearest the tuned frequency.

The process continues in the same manner, with the local oscillator controlled to produce the intermediate frequencies $F_2 \pm \Delta f/8$. This search by successive approximations is continued with the frequency excursion halved each time to obtain $F_n$ such that $\Delta f/2^n$ is below a correction threshold $S_c$ that is deemed sufficient in the present application, for example 100 Hz.

The Doppler shift is then corrected and its value is $F_n - f_T$.

The Doppler shift correction device has been described with one or three tuned filters using the surface acoustic wave technology. This example has been chosen because of its familiarity to the person skilled in the art, especially if the intermediate frequency is in the order of 10 MHz to a few tens of MHz.

The person skilled in the art knows that these filters can be implemented digitally using a digital signal processor. This implementation is particularly suitable for narrow-band systems in which channels are spaced by around 30 kHz, for example. An intermediate frequency equal to zero can then be chosen to process the signal directly in the baseband.

It is further clear that the combination of the tuned filters and the correction circuit can be represented as a single entity called hereinafter an analyzer circuit.

Also, the reference signal has been described as a signal having a frequency that varies linearly with time. This is a simple example, of course, and many other variation laws are feasible, all the more so if digital signal processing is used.

Further, the analyzer circuit that estimates the Doppler shift is implemented using one or more filters. There are other solutions, including spectral analysis using a fast Fourier transform, for example, that will not be described in further detail here since they are well known to the person skilled in the art.

A synchronization device using the signalling packet already described will now be described.

The receiver has to attempt to synchronize to at least one carrier from a plurality of carriers at frequencies $C_1$ through $C_n$.

Still referring to FIG. 2, the control circuit CC controls the local oscillator VCO so that it tunes to the carrier $C_1$. It then proceeds exactly as explained above for correcting the Doppler shift. If the correction circuit produces the change frequency signal CF, synchronization to this carrier cannot be obtained and the local oscillator VCO is then controlled so that it tunes to another carrier frequency, for example $C_2$.

If the correction circuit does not produce the change frequency signal, on the other hand, frequency synchronization to the carrier $C_1$ is acquired at the end of n measurement periods.

The time synchronization is a direct consequence of the design of the tuned filter whose characteristics are shown in FIG. 3. The filter has the peculiarity that the maximum of the main lobe appears with a time-delay equal to the sum of the propagation time of the tuned filter and the signalling packet duration relative to the start of the packet, i.e. $T_p+T$. This provides a time reference.

The control circuit can measure the time between the maxima of main lobes corresponding to two successive signalling packets. This corresponds to the repetition period $T_r$. This provides a time unit.

The time reference and the time unit having been acquired in this way, the receiver is time synchronized.

When synchronization is acquired, the same corrections are naturally used for all the channels transmitted by the same base station, whether on the same carrier or on a different carrier. These corrections can evolve in time, as in all the systems, and consequently synchronization is tracked.

Note that to acquire time synchronization the reference signal can take the most diverse forms provided that one of its characteristics varies with time. So far in this description this characteristic has been the frequency, but it could be the amplitude, for example.

All that is required is for it to be possible to determine the position of a particular point in the signalling packet.

The Doppler shift correction and synchronization steps have been described as successive, although they can be interleaved. On correcting the Doppler shift the frequency difference between the base station and the terminal is corrected, regardless of its nature. It is possible to acquire the time reference of the base station before estimating the Doppler shift.

The signalling packet repetition frequency, which is the reciprocal of the repetition period $T_r$, is usually proportional to the carrier frequency, but is very much lower than it, with the result that it is much less affected by the Doppler effect. This repetition frequency can therefore be acquired initially by measuring the time interval between two successive main lobes at the output of a tuned filter, as already explained. This produces a good approximation of the time reference of the base station and the control circuit CC corrects the local oscillator VCO so that it adopts this reference.

The Doppler shift can then be estimated as explained above, there being virtually no error in this estimate due to the difference between the time references of the base station and the terminal.

The synchronization can then be refined, also as explained above.

An advantageous solution is to implement the first part of the signal processing in the analog domain, using a surface acoustic wave filter with a relatively wide bandwidth, for example, to correct the local oscillator VCO with regard to the difference between the frequency references and possibly a first estimate of the Doppler shift. The remainder of the processing can then be in the digital domain.

A channel estimator device using the signalling packet already described is described next.

By hypothesis, the transmission channel includes n+1 separate paths $t_i$ each contributing to the transmission with a coefficient $a_i$ and each introducing a time-delay $\tau_i$ relative to the shortest path $t_0$, for which the time-delay $\tau_0$ is made equal to zero and thus constitutes the time reference, where i is an integer number between 0 and n.

The signal transmitted is the reference signal shown in FIG. 1, the instantaneous frequency f of which is:

$$f = \left(\frac{f_2 - f_1}{T}\right) \cdot t + f_1$$

The control circuit CC controls the local oscillator VCO so that it produces a frequency the slope of which has a value opposite that of the reference signal from the time reference $\tau_0$, so that this slope has the value:

$$\mu = \left(\frac{f_1 - f_2}{T}\right)$$

Figure 4:
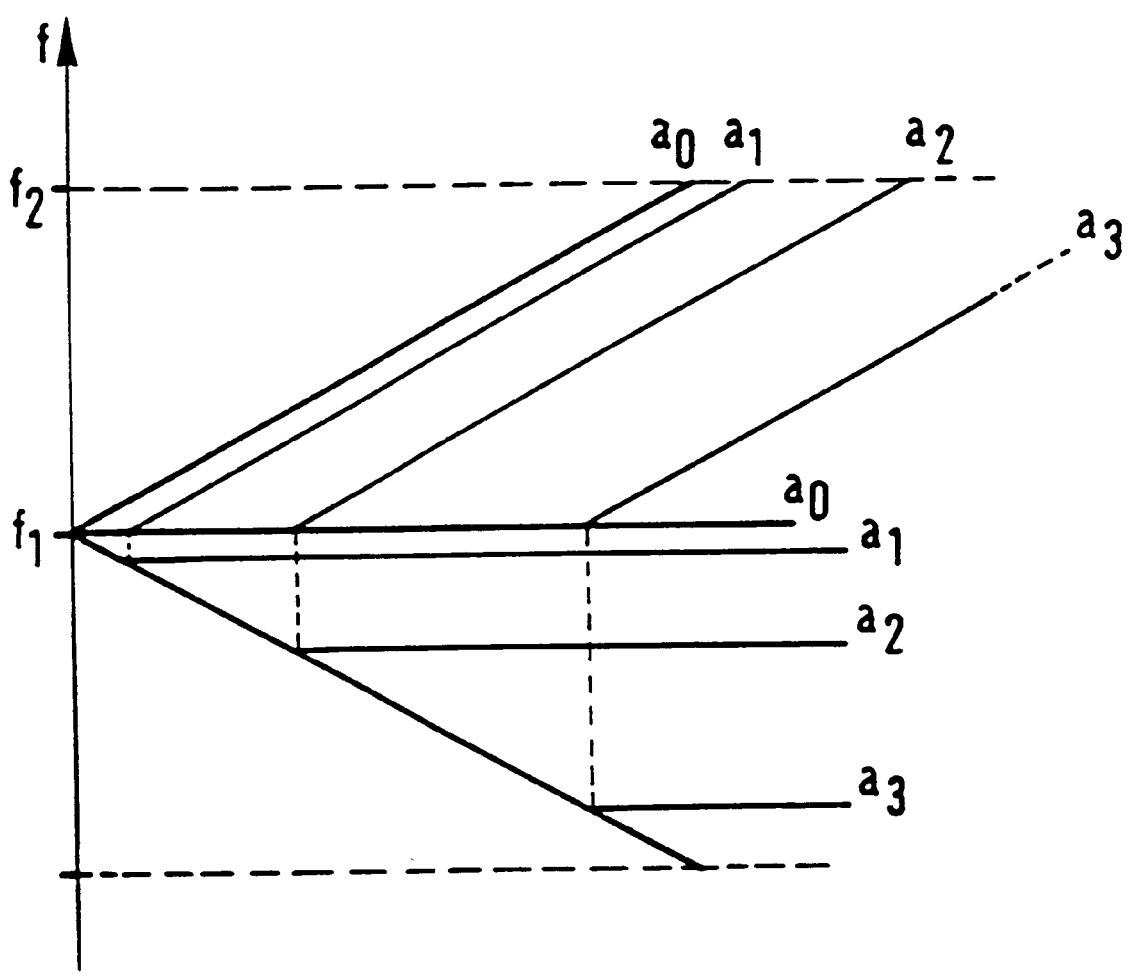
FIG. 4 shows the frequency as a function of time characteristic of a baseband signal used to estimate a transmission channel.

In this instance the analyzer circuit is a spectral analyzer module which processes the baseband received signal whose frequency components evolve in time as shown in FIG. 4, ignoring a frequency translation.

The analyzer circuit that applies the Fourier transform to the baseband signal produces a spectrum made up of lines each identified by its frequency $r_i$ and its amplitude $h_i$, where i varies from 0 through n.

The main line that corresponds to the shortest path corresponds to the highest frequency $r_0$ of the spectrum.

The next line corresponds to a path subject to a time-delay $\tau_1$ and has a frequency $r_1$. Knowing $r_0$ and $r_1$, $\tau_1$ is deduced as follows:

$$\tau_1 = \frac{r_1 - r_0}{\mu}$$

The ith line corresponds to a path subject to a time-delay $\tau_i$ and has a frequency $r_i$. Knowing $r_0$ and $r_i$, $\tau_i$ is deduced as follows:

$$\tau_i = \frac{r_i - r_0}{\mu}$$

The amplitudes hi of the various lines are naturally proportional to the coefficients $a_i$ and simple normalization is sufficient to obtain these coefficients.

The channel is therefore well characterized by the set of pairs $(\tau_i, a_i)$ for all values of i between 0 and n.

The following numerical example is for information only:
frequency excursion: $f_2-f_1$=200 kHz,
signalling packet length: T=577 $\mu$s,
reference signal slope: $-\mu$=346 MHz/s,
resolution or minimal value of $\tau_{i+1}-\tau_i$ : 2 $\mu$s.

By "resolution" is meant the time resolution allowing two nearby paths $t_{i+1}$ and $t_i$ to be distinguished. It is usually made less than a symbol period.

In this case, the minimal frequency shift Δr between the corresponding two successive lines has the value:

Δr=$r_i$−$r_{i+1}$=693 Hz.

Using a fast Fourier transform operating on N samples at a sampling frequency $F_e$, and allowing for the required resolution, the following condition applies:

$$N \geq \frac{F_e}{\Delta r}$$

If the sampling frequency is 400 kHz, the number N of samples is advantageously 1 024.

Regardless of the device under consideration, the reference signal can take many forms other than that shown in FIG. 1. The frequency variation law can be non-linear and the frequency can be made to increase and then decrease, or vice versa. The benefit of this solution is that several of the above processing operations can be carried out using a single signalling packet. If the carrier is digitally modulated, phase modulation is suitable for application of the invention. In this case, a known phase variation law is naturally applied to the reference signal.

The above description clearly shows that the invention applies to time division multiple access systems but the person skilled in the art will have no difficulty in transposing this application to code division multiple access systems.

Applications of the signalling packet in accordance with the invention have been described so far in the field of radio communications. Other possible fields include optical transmission.

In the case of transmission on optical fibers at high bit rates, it is necessary to use signal regenerators that must synchronize to the signal they receive. This problem is usually solved by placing a header at the start of a packet of symbols to be transmitted. However, a symbol spreads during transmission and this gives rise to intersymbol interference. This makes detection of the header much more difficult.

The reference signal previously described can be used instead of the header. In addition to the advantages already mentioned, this signal has better immunity to symbol spreading.

There is described next a variant of the signalling packet previously described that applies when the reference signal is modulated on two channels in phase quadrature conventionally called the I channel and the Q channel.

This variant is particularly well suited to the GLOBAL-STAR system.

The GSM frequency control burst FCH is then replaced by a replacement burst FCCHd defined as follows by its components $s_I(t)$, $S_Q(t)$:

On the I channel of a conventional transmitter:

$$S_I(t) = \cos\left(2\pi f_I \frac{t^2}{T_B}\right)$$

where t is the time variable that varies between the time t=0 that corresponds to the start of the FFCHd burst and the time t=$T_B$ that corresponds to the end of this burst, and $2f_I$ is the instantaneous frequency at the end of this burst on the I channel;

On the Q channel of the transmitter:

$$S_Q(t) = \sin\left(2\pi f_Q \frac{t^2}{T_B}\right)$$

where $2f_Q$ is the instantaneous frequency at the end of the burst on the Q channel.

The instantaneous frequency, which is known to be proportional to the derivative of the phase term, i.e. the term:

$$2\pi f_I \frac{t^2}{T_B} \quad \text{for the } I \text{ channel}$$

and $$2\pi f_Q \frac{t^2}{T_B} \quad \text{for the } Q \text{ channel}$$

varies as a linear function of time t with the same value for t=0 (start of burst) and different values ($2f_I$ and $2f_Q$, respectively) at the end of the burst (t=$T_B$).

Figure 5:
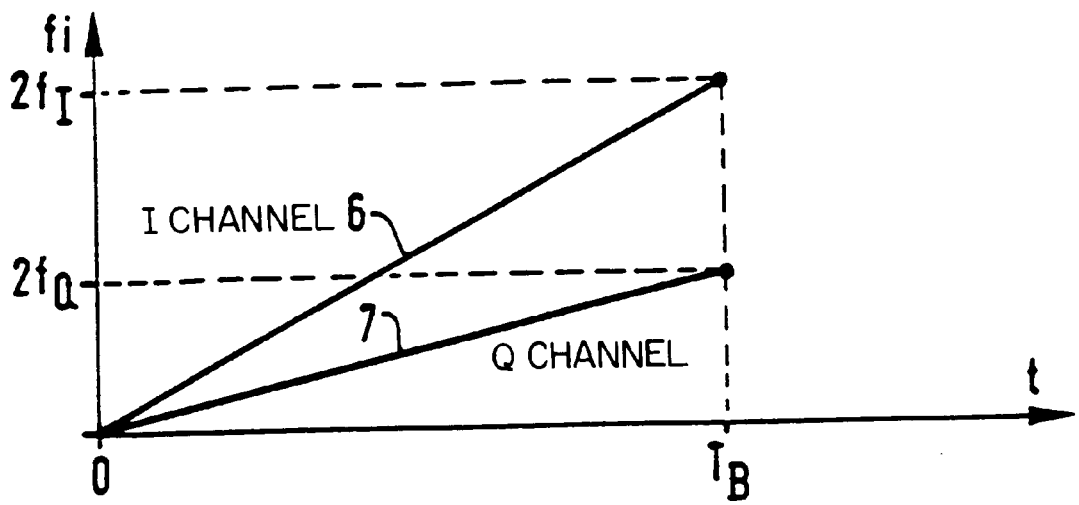
FIG. 5 shows one variant of a reference signal in accordance with the invention.

In graphical terms, the variation with time of the instantaneous frequency fi during the FCCHd burst is shown in the FIG. 5 graph, for the general case, by the straight line segment 6 for the I channel and by the straight line segment 7 for the Q channel of the transmitter.

Figure 6:
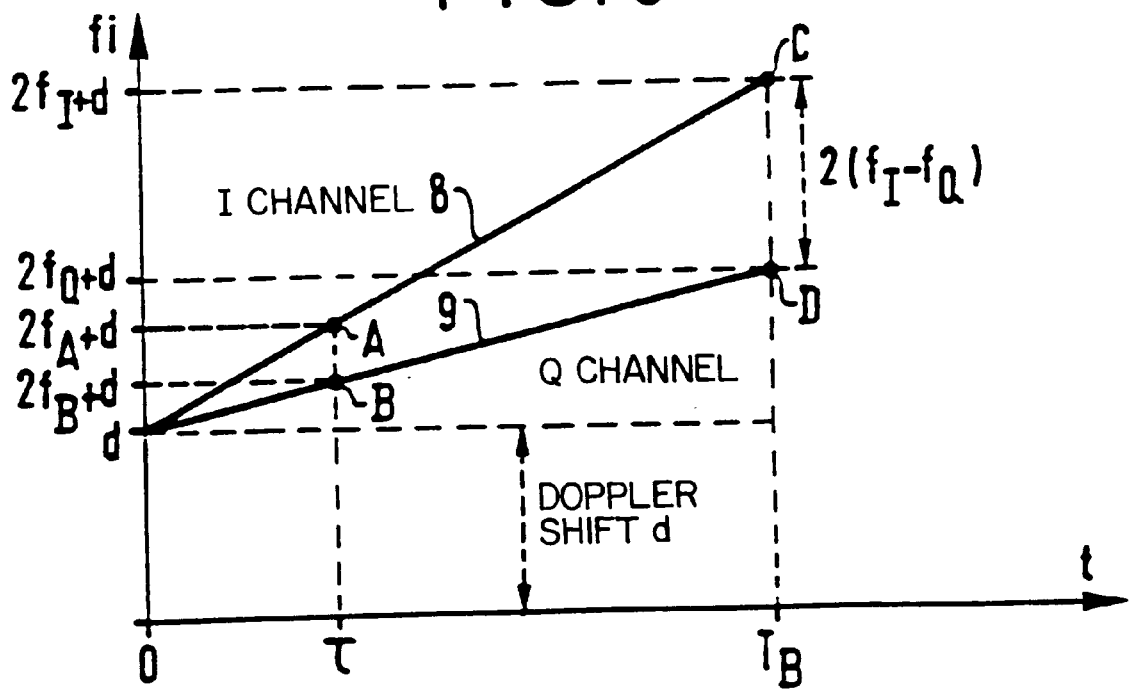
FIG. 6 shows this signal as received by a terminal.

The instantaneous frequencies of the signals associated with the I and Q channels of the receiver obtained after demodulation of a FCCHd burst received at a given time are subject to the Doppler shift d, as respectively shown by the curves 8 and 9 in FIG. 6.

The FIG. 5 and FIG. 6 curves correspond to the most general case, and this is a good opportunity to explain this.

One practical and beneficial feature of the invention is that one of the two director coefficients respectively associated with the two straight line segments representing the instantaneous frequency variation can be made equal to zero throughout the duration of the FCCHd burst.

This simplifies the installation and will be described in more detail below, after a description of a nevertheless advantageous form of processing for the general case corresponding to FIGS. 5 and 6, given next.

Figure 7:
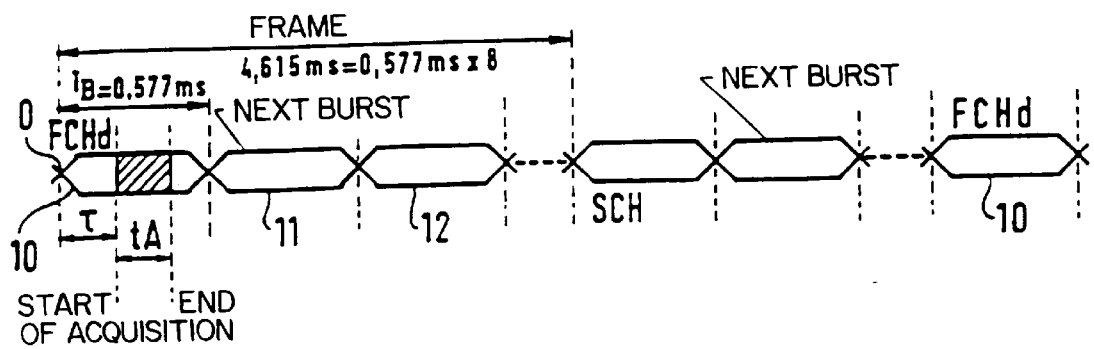
FIG. 7 shows a signalling multiframe structure.

FIG. 7 is a diagram showing the constitution in time of the signalling multiframe transmitted by the base station in time slot TN 0 on the BCH carrier frequency.

A multiframe of this kind is typically made up of 51 frames of eight bursts. The logical channels FCCHd and SCH are incorporated as follows:

the FCCHd burst always precedes the SCH burst and they are separated by eight consecutive bursts, i.e. one frame, the FCCHd burst is separated from the next FCCHd burst by 80 consecutive bursts, i.e. ten frames, the SCH burst is also separated from the next SCH burst by 80 consecutive bursts, i.e. ten frames.

Thus each of these two logical channels uses five bursts in the multiframe.

Each burst typically has a duration of 0.577 milliseconds, so that a complete multiframe has a duration of 235.365 milliseconds.

The first operation that the terminal must carry out to access the network via the satellite is to acquire a FCCHd burst on the carrier BCH that it has selected. Seeking a FCCHd burst also enables it to verify that a carrier BCH is present on the selected carrier frequency.

The first operation that the mobile terminal carries out after selecting a carrier that it assumes is a carrier BCH is to test for the presence of a FCCHd burst (10 in FIG. 7) among the first 80 bursts conveyed by this carrier.

How the presence of a burst of this kind can be detected among the others is explained below, but in any event each investigation is carried out by acquiring a sufficient number N of samples on the two channels in quadrature I and Q, for example 30 samples.

The N samples required for this process are acquired during a time $t_A$ (FIG. 7). In FIG. 7 the acquisition of a burst is shown shaded and this burst is assumed to be the FCCHd burst 10 looked for.

However, even if the FCCHd burst 10 is acquired, as shown in FIG. 7, it is obvious that acquisition is commanded at a random time relative to the real start 0 of the FCCHd burst (FIG. 6).

To access the network the terminal must be able to synchronize accurately to the start 0 of the FCCHd burst.

To achieve this synchronization, it is therefore necessary to determine accurately the time interval $\tau$ which separates the start of the acquisition of the N samples from the real start 0 of the FCCHd burst.

In accordance with the invention, this time interval $\tau$ is determined by a simple similar triangles calculation yielding a rule of three, in the following manner (see FIG. 6):

Considering FIG. 6 from a purely plane geometrical point of view, the following simple geometrical relationship applies:

$$\frac{0\tau}{0T_B} = \frac{AB}{CD}$$

The length of the segment $0T_B$ is known, corresponding to the duration $T_B$ of the burst. Likewise the segment CD, which corresponds to the difference between the (known) instantaneous frequencies at the end of the burst, respectively $2f_I$ and $2f_Q$. The segment AB is the difference between the instantaneous frequencies $2f_A$ and $2f_B$ on the I and Q channels of the receiver at the time acquisition of the N samples begins: this difference is easily determinable by spectrum analysis.

The required length of the segment $0\tau$ is then simply calculated from the equation:

$$0\tau = 0T_B \cdot \frac{AB}{CD}$$

or in other words from the rule of three:

$$\tau = T_B \cdot \frac{2f_A - 2f_B}{2f_I - 2f_Q} = T_B \cdot \frac{f_A - f_B}{f_I - f_Q}$$

Figure 8:
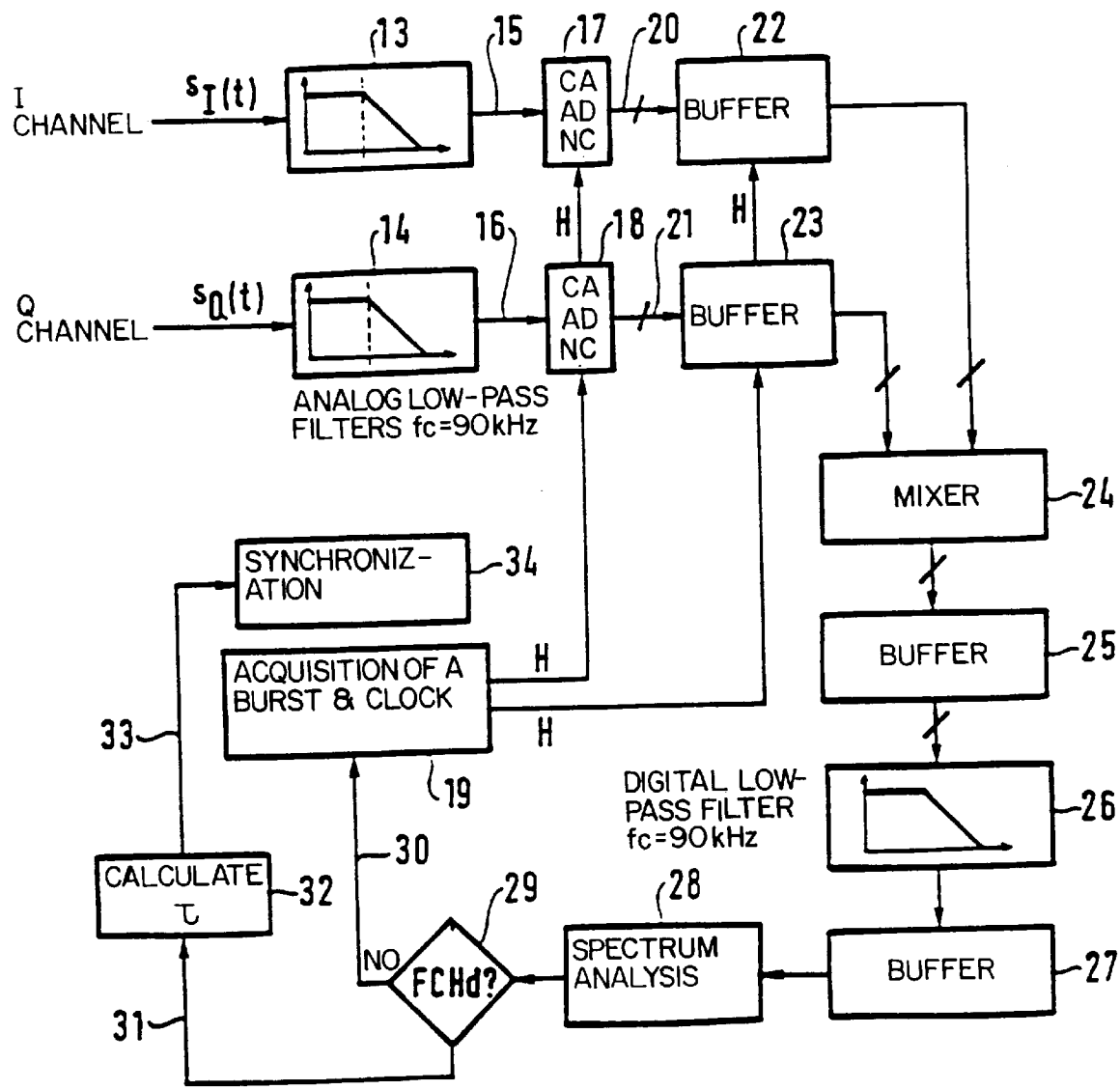
FIG. 8 shows a block diagram of a synchronization device.

FIG. 8 shows the synoptic and software architecture enabling all this series of operations, i.e. acquisition of the BDHd burst 10 and synchronization of the terminal to this burst, to be carried out. This architecture will now be explained in more detail.

Referring to FIG. 8, the respective analog signal received in the baseband on the quadrature channels I and Q is, in the case of a FCCHd burst:

$$\text{on the } I \text{ channel: } s_I(t) = \cos\left(2\pi f_I \frac{t^2}{T_B} + 2\pi dt + \varphi\right)$$

-continued $$\text{on the } Q \text{ channel: } s_Q(t) = \sin\left(2\pi f_Q \frac{t^2}{T_B} + 2\pi dt + \varphi\right)$$

where d is the aforementioned value of the Doppler shift and $\phi$ is the phase-shift term.

The two signals $s_I(t)$ and $s_Q(t)$ are each applied to a respective analog low-pass filter 13 and 14, the cut-off frequency fc of which is equal to the operating bandwidth, which is 90 kHz in this example.

The conventional function of the filters 13 and 14 is to eliminate unwanted intermodulation products.

The filtered signals at the outputs 15 and 16 of the analog filters 13 and 14 are digitized by respective analog/digital converters 17 and 18 which are synchronized to the sampling frequency by a clock signal H from the unit 19 which is an integral part of the central logic unit of the terminal.

Two 8-bit format buses 20 and 21 respectively connect the analog/digital converters 17 and 18 to respective buffers 22 and 23 which are also synchronized by the clock signal H.

Each calculation sequence comprises, under the control of the unit 19, the acquisition of N successive samples of each of the digitized signals $S_I(t)$ and $S_Q(t)$. This acquisition is shown diagrammatically in FIG. 7 by the shaded part of the FCCHd burst 10.

The successive samples acquired by the buffers 22 and 23 are mixed one to one in a digital mixer or multiplier 24.

The digital signal produced by this multiplication is then, ignoring the previously mentioned factors of proportionality:

$$s_I(t) \cdot s_Q(t) = \cos\left(2\pi f_I \frac{t^2}{T_B} + 2\pi dt + \varphi\right) \cdot \sin\left(2\pi f_Q \frac{t^2}{T_B} + 2\pi dt + \varphi\right)$$

that is, by expanding:

$$s_I(t) \cdot s_Q(t) = \frac{1}{2}\left[\sin\left(4\pi dt + 2\pi(f_I + f_Q)\frac{t^2}{T_B} + 2\varphi\right) - \sin\left(2\pi(f_I - f_Q)\frac{t^2}{T_B}\right)\right]$$

in the case of a FCCHd burst (at this stage it is not known whether the burst is a FCCHd burst or not).

This signal $s_I(t) \cdot s_Q(t)$ is then stored in another buffer 25.

If the burst is not a FCCHd burst, but some other burst such as the burst 11 or 12, or a burst of a carrier that is not the required carrier BCH, the received analog signal is, ignoring a factor of proportionality:

on the I channel: $s_I(t) = \cos[\Phi(t) + 2\pi dt + \phi]$ on the Q channel: $s_Q(t) = \sin[\Phi(t) + 2\pi dt + \phi]$ where $\Phi(t)$ is the information signal conveyed by this burst.

The product $s_I(t) \cdot s_Q(t)$ formed by the digital multiplier 24 and stored sample by sample in the buffer 25 is then equal to:

$s_I(t) \cdot s_Q(t) = \sin(4\pi dt + 2\Phi(t) + 2\phi)$

In accordance with the invention, the various samples of the product $s_I(t) \cdot s_Q(t)$ stored in this buffer are passed to a digital low-pass filter 26 the cut-off frequency fc of which is equal to the bandwidth of the system, which is 90 kHz in this example.

The resulting filtered signal is stored sample by sample in another buffer 27 for spectrum analysis in the unit 28 to determine whether a line at a frequency corresponding to a pure sinusoid in the frequency range corresponding to the baseband (in this example from 0 to 90 kHz) is present in the stored signal or not.

If the burst selected is not a FCCHd burst, the aforementioned product obtained:

sin [4πdt+2Φ(t)+2φ]

corresponds to a component having a frequency greater than the maximal frequency (90 kHz) of the baseband. This "high-frequency" component is eliminated by the low-pass filter 26, with the result that the spectrum analysis 28 does not reveal any frequency line, but only noise.

The answer to the question: "is this a FCCHd burst?", shown symbolically by the lozenge 29, is in the negative and the calculation unit 19 receives corresponding information 30 that instigates acquisition of the next numbered burst.

If, after 80 successive investigations of this type processing all the bursts of a multiframe, the response at 29 is still in the negative, this means that the selected carrier frequency is not the carrier frequency BCH of the base station and the terminal therefore selects another carrier, and tries again to find a FCCHd burst.

If the selected burst is a FCCHd burst, on the other hand, as shown in FIG. 7, the highest frequency component of the equation given previously that results from calculation of the product $s_I(t) \cdot s_Q(t)$ is eliminated by the low-pass filter 26, with the result that the buffer 27 stores only the following term:

$$s_I(t) \cdot s_Q(t) = -\frac{1}{2}\sin\left(2\pi(f_1 - f_Q)\frac{t^2}{T_B}\right)$$

again ignoring a factor of proportionality.

The instantaneous frequency fi of a signal of this kind is represented by the derivative of the term:

$$(f_1 - f_Q)\frac{t^2}{T_B}$$

and is therefore equal to:

$$fi = 2(f_1 - f_Q)\frac{t}{T_B}$$

The fine spectrum analysis effected by the analyzer 28 then necessarily reveals the presence of a line at a frequency corresponding to a pure sinusoid of frequency fi and the answer to the question in the lozenge 29 is then in the affirmative: this is a FCCHd burst.

Over the link 31, control information is then applied to a unit 32 for calculating the aforementioned time τ between the time of acquisition and the first sample from the start of this FCCHd burst, this calculation being naturally carried out using the rule of three previously referred to.

When this time τ has been determined, the unit 32 sends this information over a link 33 to the synchronization unit 34 which synchronizes the terminal to the start of the FCCHd burst 10 accordingly. At this stage the terminal is synchronized in time, i.e. it knows how to find the start of each burst.

The description so far with reference to FIGS. 7 and 8 is equally valid for the general case (FIG. 6) and the fairly advantageous particular case in which one of the two director coefficients of one of the two straight line segments representing the variation of the instantaneous frequency of the transmitted signal is null and the point of departure of both variation laws is the origin of the axes in the FIG. 6 diagram.

The second step of the sequence of operations carried out by the terminal then consists in determining the value of the Doppler shift d.

This second step is explained with reference to FIG. 9 in the general case (FIG. 6) and with reference to FIG. 10 in the abovementioned particular case where one of the two director coefficients associated with the respective straight line segments representing variation of the instantaneous frequency fi is made equal to zero.

Figure 9:
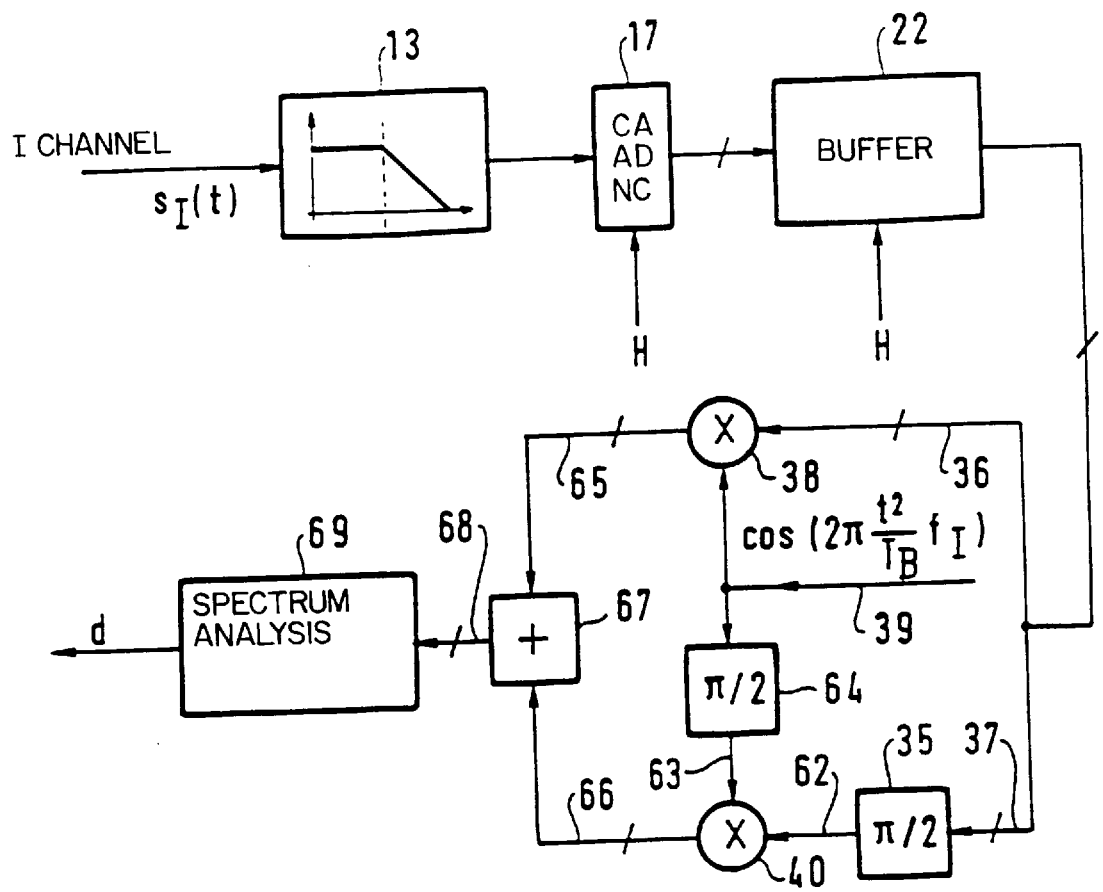
FIG. 9 shows a block diagram of a device for determining the absolute value of the Doppler shift.

For a single quadrature channel, for example the I channel in FIG. 9, the procedure entails:

Sampled acquisition of the complete FCCHd burst, after filtering (low-pass filter 13 previously described) and digitizing (analog/digital converter 17 previously described) the analog signal:

$$s_I(t) = \cos\left(2\pi f_I \frac{t^2}{T_B} + 2\pi dt + \varphi\right)$$

For example, M=156 samples of the complete burst are acquired in this way.

These M samples are stored in the buffer 22 previously described (see FIG. 8).

Splitting each of these M samples taken successively from the buffer 22 between two channels 36 and 37.

Applying a phase-shift of +90° to the signal on the channel 37 in the phase-shifter 35.

Multiplying the signal on the channel 36 in which there is no +90° phase-shift by another signal 39 in a first multiplier 38, the other signal 39 being synthesized, digitized and sampled by the central unit of the terminal and being equal, ignoring a factor of proportionality, to:

$$\cos\left(2\pi f_I \frac{t^2}{T_B}\right)$$

and corresponding to a component of the signal FCCHd as transmitted by the terrestrial base station.

On the other channel 37, multiplying the signal 62 phase-shifted by +90° by the phase-shifter 35 by a signal 63 in a second multiplier 40, the signal 63 being obtained after shifting the phase of the aforementioned signal 39 by +90° in another phase-shifter 64.

In concrete terms, the signal at the output 62 of the phase-shifter 35 is of the form:

$$-\sin\left(2\pi f_I \frac{t^2}{T_B} + 2\pi dt + \varphi\right)$$

and the signal at the output 63 of the phase-shifter 64 is of the form:

$$-\sin\left(2\pi \frac{t^2}{T_B} f_I\right)$$

the factors of proportionality being again ignored here, and in everything that follows.

Thus after the respective multiplication operation in the multipliers 38 and 40, the signal at the output of the multiplier 38 is of the form:

$$\cos\left(2\pi f_I \frac{t^2}{T_B} + 2\pi dt + \varphi\right) \cdot \cos\left(2\pi f_I \frac{t^2}{T_B}\right),$$

and the signal at the output 66 of the multiplier 60 is of the form:

$$\sin\left(2\pi f_I \frac{t^2}{T_B} + 2\pi dt + \varphi\right) \cdot \sin\left(2\pi f_I \frac{t^2}{T_B}\right).$$

The remainder of the processing then consists in:
Adding the two signals just mentioned present on the buses 65 and 66 in a digital adder 67.
After development and simplification, it is happily found that the signal obtained at the output 68 of the adder 67 is simply of the form:

cos (2πdt+φ).

In an analyzer 69 similar to the analyzer 38 of FIG. 5, for example a Fast Fourier Transform (FFT) analyzer, spectrum analyzing the signal thus obtained on the bus 68, the analysis being sufficiently fine to eliminate additive Gaussian white noise.
This extracts the required absolute value of the Doppler shift d.

In the foregoing description, it is of course assumed that the Doppler shift d does not in practise vary sufficiently to influence the results of the above processing during the FCCHd burst in question.

Figure 10:
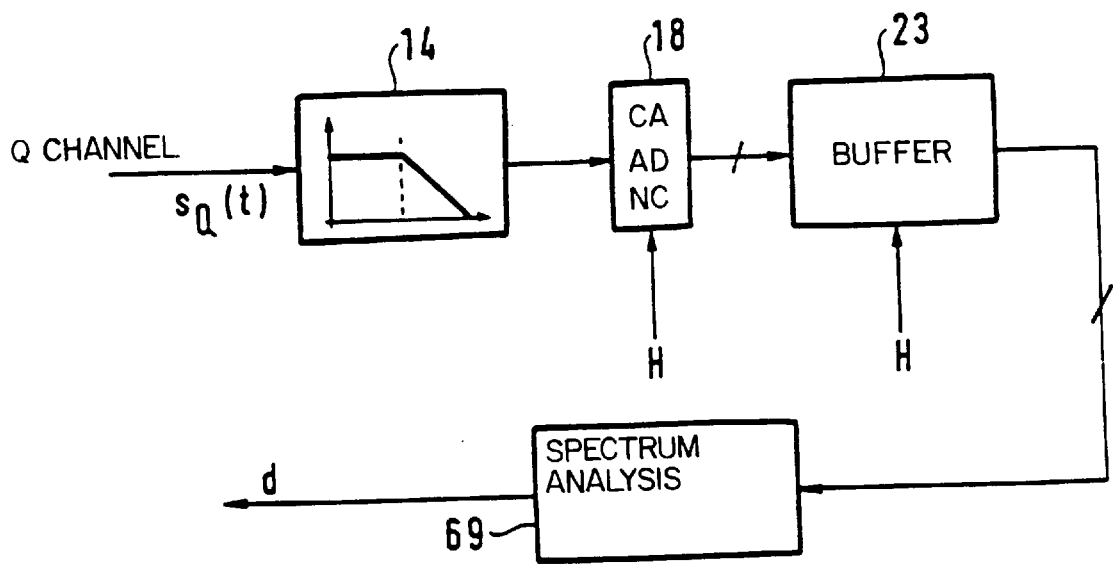
FIG. 10 shows a block diagram of a simplified device for determining the absolute value of the Doppler shift.
Figure 11:
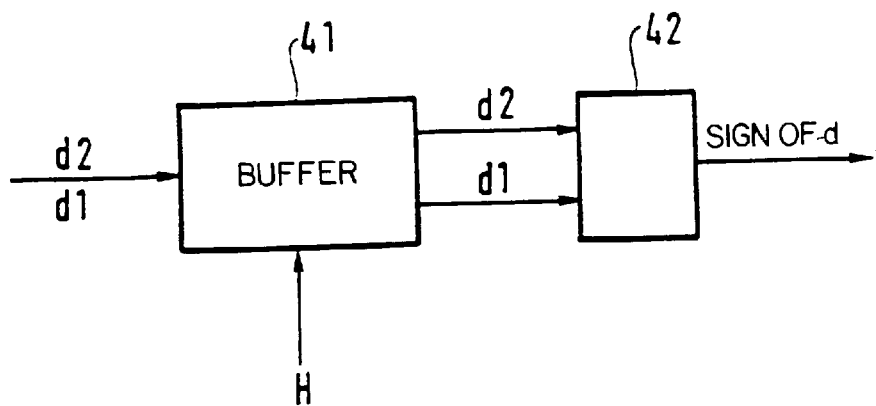
FIG. 11 shows a block diagram of a device for determining the sign of the Doppler shift.

Turning now to the particular case, also of interest because of its relative simplicity, in which the FCCHd burst 10 is created by the base station in such a manner that the curve 7 in FIG. 5 is a horizontal straight line segment coincident with time axis Ot, the instantaneous frequency fi is constant and equal to zero throughout the FCCHd burst as synthesized by the base station, the determination of the Doppler shift d is somewhat simplified (FIG. 10).

The baseband signal received on the Q channel of said receiver is then of the form:

$s_Q(t) = \sin(2\pi dt + \varphi)$.

As in FIG. 9, M samples of a complete FCCHd burst are then acquired on the Q channel in the buffer 23 already described with reference to FIG. 8. This uses the low-pass filter 14 and the analog/digital converter 18 already described with reference to FIG. 8.

The Doppler shift d is then simply determined by spectrum analysis of the stored signal. The analyzer 69 from FIG. 9 is used for this, for example.

The next step is to determine the sign of the Doppler shift D.

The sign is obtained by determining the absolute value of two successive Doppler shifts d1 and d2 separated by a time interval of between one second and a few seconds, sufficient for the Doppler shift to have time to vary significantly. The absolute values are determined as explained above with reference to FIG. 9 or FIG. 10.

The digitized absolute values |d2| and |d1| of the two Doppler shifts are stored in a buffer 41 and then compared by a digital comparator 42.

If the result of this comparison indicates that |d2| is greater than |d1|, the satellite is moving away from the terminal and consequently the sign of the Doppler shift is negative.

If the result of this comparison indicates that |d2| is less than |d1|, the satellite is moving towards the terminal and consequently the sign of the Doppler shift is positive.

If the comparison indicates that |d2| is virtually equal to |d1|, which is necessarily extremely rare, the satellite has just passed the zenith and is therefore about to move away from the terminal:

the sign to be taken into account for the Doppler shift d is therefore in fact the negative sign.

The final step is to compensate the Doppler shift d for the signal received by the terminal, to enable the terminal to operate.

The Doppler shift d must be compensated throughout the use of the satellite for the current telephone conversation. Given the time for which a satellite of this kind is in view, this time period is in the order of ten minutes.

The satellite then disappears over the horizon, and another takes over from it, and so on indefinitely.

To be able to correct it continuously, and not only at a given time, the Doppler shift must be tracked throughout the time in view and actual use of the satellite.

A first approach, the simplest from the intellectual point of view but the most costly to implement, is for the terminal to measure the Doppler shift at quasi-regular time intervals, for example about every ten seconds.

For each measurement, the terminal corrects the frequency of the local oscillator of the demodulator according to the measured Doppler shift and adjusts the time interval between two consecutive measurements according to the magnitude of the measured frequency variation between the two consecutive measurements.

Figure 12:
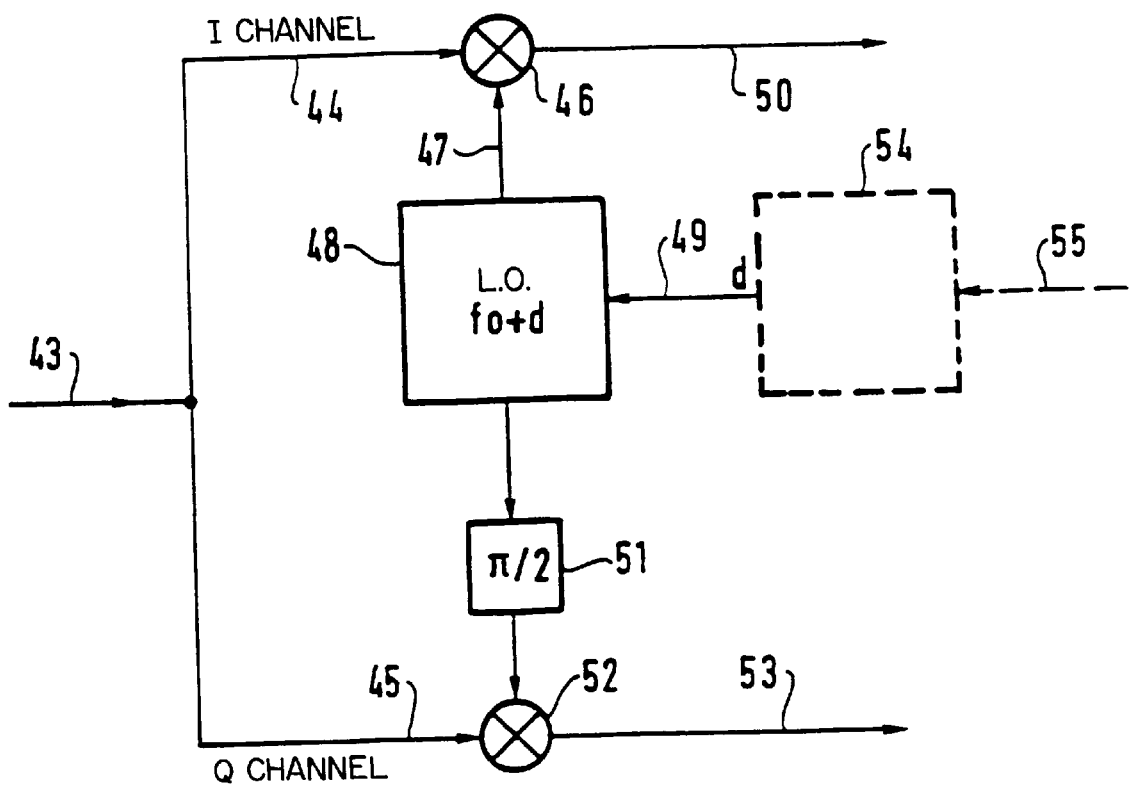
FIG. 12 shows a block diagram of a device for correcting the Doppler shift.

A very general schematic of the frequency shift d compensation or correction system is shown in full line in FIG. 12.

FIG. 12 shows the conventional diagram for phase quadrature demodulation of the analog signal received by the terminal.

The modulated analog signal on the receive line is conventionally split between two channels: the I channel on the line 44 and the Q channel on the line 45.

The I channel signal is fed to a first analog mixer 46 which receives at its other input 47 the fixed frequency signal from the local oscillator 48.

However, the local oscillator is not a conventional local oscillator of fixed frequency f0, but rather a voltage-controlled oscillator (VCO) receiving at its control input a voltage representing the Doppler shift d determined by the terminal in the manner described above.

The frequency of the local oscillator 48 is therefore not its inherent frequency f0, that it would have in the absence of Doppler shift correction, but the algebraic sum (f0+d) of this frequency f0 and the Doppler shift d.

The demodulated signal on the I channel at the output 50 of the mixer 46 is therefore a demodulated signal in which the Doppler shift has been compensated.

Likewise, and in a manner that in itself is totally conventional, this signal at frequency (f0+d) generated by the local oscillator 48 is applied via a conventional 90° phase-shifter 51 to another mixer 52 that also receives the Q channel signal and the output 53 of which carries the demodulated signal on the Q channel.

In this first approach, the signal at the control input 49 of the local oscillator 48 is thus produced directly from the value of the Doppler shift d measured as part of the correction process.

This solution is relatively costly, however, since it requires the Doppler shift to be calculated a relatively large number of times.

A second solution which is usually preferable consists in (see dashed line part of FIG. 12) providing, for generation of the Doppler correction d to be applied to the control input 49 of the local oscillator 48, a real time correction by means of a logic device 54 for automatically tracking the Doppler shift d in accordance with the known displacement of the satellite in use, and a limited number of measurements of the Doppler shift carried out as previously described and fed into the logic device 54 via an input gate 55 of the latter.

Figure 13:
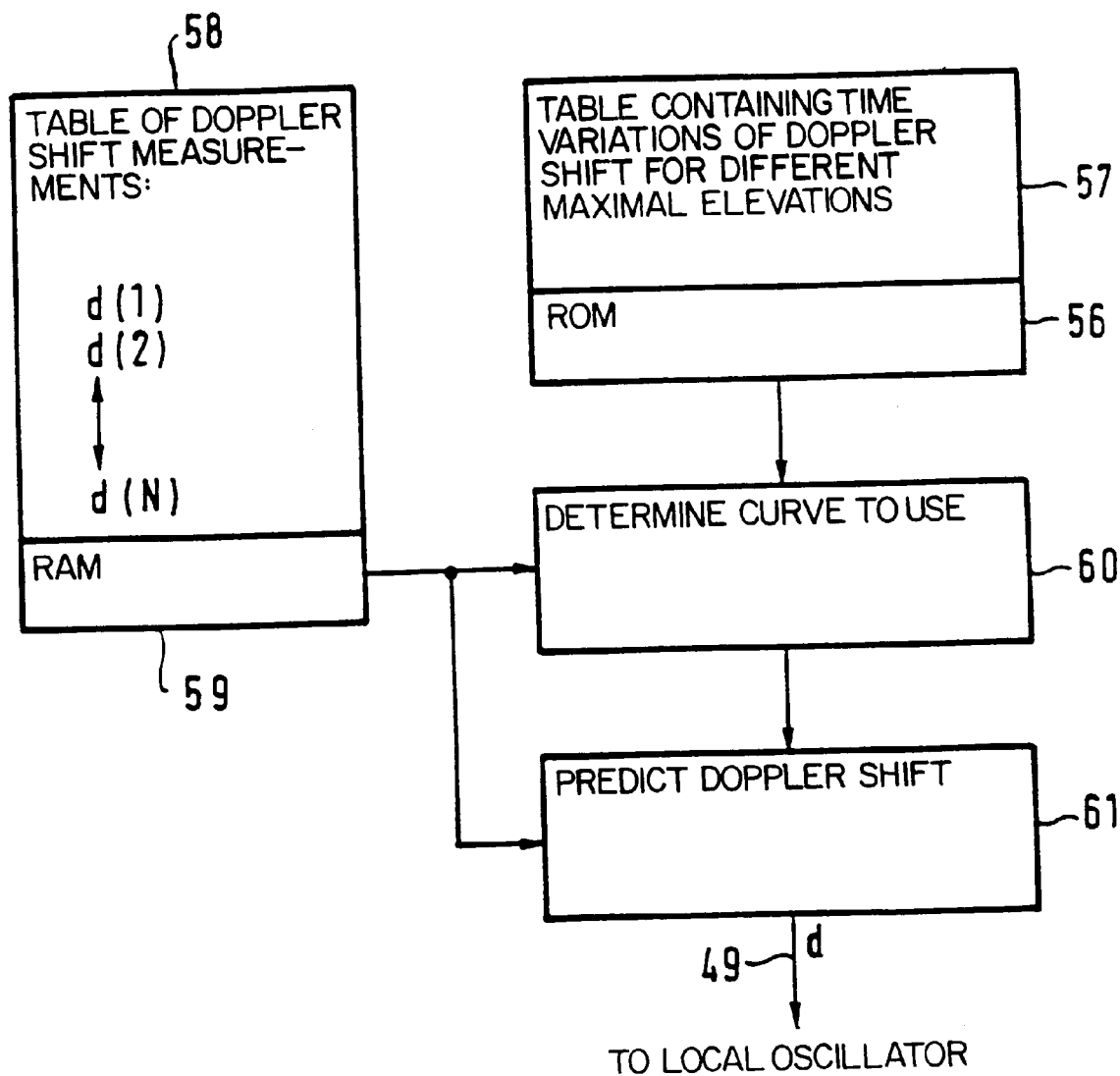
FIG. 13 shows a block diagram of a device for tracking the Doppler shift.

The design and operation of the logic device 54 for automatically tracking the Doppler shift will now be explained with reference to FIG. 13.

For a given mobile terminal, the variation in the value of the Doppler shift depends on its position relative to the path followed by the satellite. Seen from the terminal, the path followed by the satellite is characterized by a parameter called the maximal elevation and denoting the maximal angle between the terminal-horizon line and the terminal-satellite line. In concrete terms, this maximal elevation varies between 20° and 90°.

A non-volatile read-only memory (ROM) 56 of the terminal contains a table 57 of known variations of the Doppler shift d for different maximal elevations of each satellite. In other words, in this non-volatile memory 56 the terminal has the associated curve of variation of the Doppler shift for each particular path of each satellite (and therefore for a given maximal elevation).

For example, 70 curves are stored in memory in this way and the resolution for the maximal elevation is taken as 1°.

When it is switched on, the terminal (unit 58 including a volatile random access memory (RAM) 59) measures and stores N values of the Doppler shift: d(1), d(2), . . . , d(N). The number N is a few tens, for example. In a logic unit 60 these measured values are compared to the data pre-stored in the ROM 56. This gives the Doppler shift variation curve to be used at the time in question, if the measurements carried out allow this.

Another calculation unit 61 then predicts and supplies the Doppler shift d correction voltage to be applied to the local oscillator (via the link 49: compare with FIG. 12).

If the original measurements d(1) through d(N) just mentioned do not enable the logic unit 60 to determine the pre-stored curve to be used, the terminal carries out a further series of measurements via the logic unit 58.

It goes without saying that the invention is not limited to the embodiment that has just been described. To the contrary, it can be implemented in many other equivalent forms.

We claim:

1. A communication system including receiving means for receiving communication signals which are transmitted on a plurality of transmission channels, wherein said receiving means include a synchronizing device for time and frequency synchronizing to a carrier which is associated to one of said transmission channels using a single signalling packet having a duration T and being transmitted periodically with a repetition period $T_r$ said signalling packet including a reference signal modulated in accordance with a modulation law, said modulation law being a predetermined function varying with time within said signalling packet.

2. A communication system according to claim 1, wherein said receiving means further include a Doppler shift estimating device for estimating a Doppler shift of said carrier and a channel estimating device for estimating said one of said transmission channel by using said single signalling packet.

3. The communication system according to claim 2, wherein said reference signal is frequency modulated.

4. The communication system according to claim 3, wherein said modulation law is applied on two channels in quadrature, two separate functions being used for each of said two channels.

5. The communication system according to claim 3, wherein said Doppler shift estimating device comprises:

a local oscillator generating a local oscillator output signal, a mixer receiving said received carrier signal and said local oscillator output signal and producing a mixer output signal, wherein said received carrier signal includes said signalling packet, a filter receiving said mixer output signal and producing a signal of intermediate frequency, an analyzer circuit receiving said signal of intermediate frequency and producing a shift signal representing a Doppler effect frequency shift between a theoretical frequency and said intermediate frequency, said shift signal having a shift signal frequency, and a control circuit controlling said local oscillator to establish an estimate of said Doppler shift from said shift signal.

6. The communication device according to claim 5 wherein said control circuit controls said local oscillator also to reduce said frequency shift.

7. The communication device according to claim 5, wherein:

said analyzer circuit comprises:

a first filter having a first center frequency of said theoretical frequency and producing a first filter output signal, and a corrector circuit producing a first form factor of said first filter output signal, and said control circuit controls said local oscillator to maximize said first form factor.

8. The communication system according to claim 7, wherein said control circuit performs said control of said local oscillator by successive approximation, applying a frequency correction on either side of a frequency that produces a greatest form factor to search again for said greatest form factor, successive searches being conducted by reducing values of said frequency correction as far as a predetermined correction threshold.

9. The communication system according to claim 7; wherein:

a shift amplitude has a value substantially equal to a maximum Doppler shift of said signal of intermediate frequency, said analyzer circuit further comprises a second filter and a third filter, said second filter has a second center frequency of said theoretical frequency decreased by said shift amplitude, and produces a second filter output signal, said third filter has a third center frequency of said theoretical frequency increased by said shift amplitude, and produces a third filter output signal, said corrector circuit produces a second form factor of said second filter output signal and produces a third form factor of said third filter output signal, a barycenter is defined based on said first center frequency weighted by said first form factor, said second center frequency weighted by said second form factor, and said third center frequency weighted by said third form factor, and said corrector circuit produces said shift signal proportional to an opposite of said barycenter.

10. The communication system according to claim 9, wherein said control circuit controls said local oscillator so that said intermediate frequency is increased by said shift signal frequency.

11. The communication system according to claim 2, wherein said predetermined function varies linearly with time.

12. The communication system according to claim 10, wherein said Doppler shift estimating device comprises:
 a local oscillator generating a local oscillator output signal,
 a mixer receiving said received carrier signal and said local oscillator output signal and producing a mixer output signal, wherein said received carrier signal includes said signalling packet,
 a filter receiving said mixer output signal and producing a signal of intermediate frequency,
 an analyzer circuit receiving said signal of intermediate frequency and producing a shift signal representing a Doppler effect frequency shift between a theoretical frequency and said intermediate frequency, said shift signal having a shift signal frequency, and
 a control circuit controlling said local oscillator to establish an estimate of said Doppler shift from said shift signal.

13. The communication device according to claim 12, wherein said control circuit controls said local oscillator also to reduce said frequency shift.

14. The communication device according to claim 12, wherein:
 said analyzer circuit comprises:
  a first filter having a first center frequency of said theoretical frequency and producing a first filter output signal, and
  a corrector circuit producing a first form factor of said first filter output signal, and
 said control circuit controls said local oscillator to maximize said first form factor.

15. The communication system according to claim 14, wherein said control circuit performs said control of said local oscillator by successive approximation, applying a frequency correction on either side of a frequency that produces a greatest form factor to search again for said greatest form factor, successive searches being conducted by reducing values of said frequency correction as far as a predetermined correction threshold.

16. The communication system according to claim 14, wherein:
 a shift amplitude has a value substantially equal to a maximum Doppler shift of said signal of intermediate frequency,
 said analyzer circuit further comprises a second filter and a third filter,
 said second filter has a second center frequency of said theoretical frequency decreased by said shift amplitude, and produces a second filter output signal,
 said third filter has a third center frequency of said theoretical frequency increased by said shift amplitude, and produces a third filter output signal,
 said corrector circuit produces a second form factor of said second filter output signal and produces a third form factor of said third filter output signal,
 a barycenter is defined based on said first center frequency weighted by said first form factor, said second center frequency weighted by said second form factor, and said third center frequency weighted by said third form factor, and
 said corrector circuit produces said shift signal proportional to an opposite of said barycenter.

17. The communication system according to claim 16, wherein said control circuit controls said local oscillator so that said intermediate frequency is increased by said shift signal frequency.

18. The communication device according to claim 1, wherein said synchronizing device comprises:
 a local oscillator generating a local oscillator output signal, a mixer receiving said received carrier signal and said local oscillator output signal and producing a mixer output signal, wherein said received carrier signal includes said signalling packet,
 a filter receiving said mixer output signal and producing a signal of intermediate frequency,
 an analyzer circuit receiving said signal of intermediate frequency, producing a change frequency signal when said reference signal is not detected, and producing a frequency shift signal when said reference signal is detected, said frequency shift signal representing a shift between a theoretical frequency and said intermediate frequency, and
 a control circuit responsive to said change frequency signal to control said local oscillator to tune, after a measurement period of a duration greater than or equal to T+Tr, to another carrier, said control circuit controlling said local oscillator to reduce a value of said frequency shift signal in an absence of said change frequency signal.

19. The communication system according to claim 18, wherein:
 said analyzer circuit comprises:
  a first filter tuned to said reference signal, having a first center frequency of said theoretical frequency, and producing a first filter output signal, and
  a corrector circuit producing a first form factor of said first filter output signal; and
 said control circuit controls said local oscillator to maximize said first form factor.

20. The communication system according to claim 19; wherein said control circuit performs said control of said local oscillator by successive approximation, applying a frequency correction on either side of a frequency that produces a greatest form factor to search again for said greatest form factor, successive searches being effected by reducing values of said frequency correction as far as a predetermined correction threshold.

21. The communication system according to claim 2, wherein said Doppler shift estimating device comprises:
 a local oscillator generating a local oscillator output signal,
 a mixer receiving said received carrier signal and said local oscillator output signal and producing a mixer output signal, wherein said received carrier signal includes said signalling packet,
 a filter receiving said mixer output signal and producing a signal of intermediate frequency,
 an analyzer circuit receiving said signal of intermediate frequency and producing a shift signal representing a Doppler effect frequency shift between a theoretical frequency and said intermediate frequency, said shift signal having a shift signal frequency, and
 a control circuit controlling said local oscillator to establish an estimate of said Doppler shift from said shift signal.

22. The communication device according to claim 21 wherein said control circuit controls said local oscillator also to reduce said frequency shift.

23. The communication device according to claim 21, wherein:
 said analyzer circuit comprises:

a first filter having a first center frequency of said theoretical frequency and producing a first filter output signal, and a corrector circuit producing a first form factor of said first filter output signal, and said control circuit controls said local oscillator to maximize said first form factor.

24. The communication system according to claim 23, wherein said control circuit performs said control of said local oscillator by successive approximation, applying a frequency correction on either side of a frequency that produces a greatest form factor to search again for said greatest form factor, successive searches being conducted by reducing values of said frequency correction as far as a predetermined correction threshold.

25. The communication system according to claim 23, wherein:

a shift amplitude has a value substantially equal to a maximum Doppler shift of said signal of intermediate frequency, said analyzer circuit further comprises a second filter and a third filter, said second filter has a second center frequency of said theoretical frequency decreased by said shift amplitude, and produces a second filter output signal, said third filter has a third center frequency of said theoretical frequency increased by said shift amplitude, and produces a third filter output signal, said corrector circuit produces a second form factor of said second filter output signal and produces a third form factor of said third filter output signal, a barycenter is defined based on said first center frequency weighted by said first form factor, said second center frequency weighted by said second form factor, and said third center frequency weighted by said third form factor, and said corrector circuit produces said shift signal proportional to an opposite of said barycenter.

26. The communication system according to claim 25, wherein said control circuit controls said local oscillator so that said intermediate frequency is increased by said shift signal frequency.

27. The communication system according to claim 2, wherein said channel estimating device comprises:

a local oscillator generating a local oscillator output signal, a mixer receiving said received carrier signal and said local oscillator output signal and producing a mixer output signal, wherein said received carrier signal includes said signalling packet, a filter receiving said mixer output signal and producing a signal of intermediate frequency, an analyzer circuit receiving said signal of intermediate frequency and transposing said signal of intermediate frequency into a baseband to produce a spectrum of said channel, and a control circuit controlling said local oscillator to establish an estimate of said channel from said spectrum.

28. The communication system according to claim 27, wherein:

said reference signal has a reference signal frequency with a respective constant slope $-\mu$, said control circuit controls said local oscillator to produce an opposite slope signal having a respective frequency having a respective slope $\mu$ opposite said respective constant slope of said reference signal, said control circuit produces said opposite slope signal starting from reception of said received carrier signal via a shortest path $t_0$ of said channel, said channel spectrum has a set of lines each having a respective frequency $r_i$ and a respective amplitude $h_i$, each of said set of lines corresponding to a respective path $t_i$ wherein said respective frequency $r_i$ is related to a length of said respective path $t_i$, and said control circuit produces said estimate by characterizing each said respective path $t_i$ by:
a respective path contribution proportional to said respective amplitude $h_i$, and
a respective time-delay $\tau_i$ which has a value $(r_i-r_0)/\mu$, for all values of i between 0 and n where (n+1) separate paths are considered.

29. The communication system according to claim 1, wherein said reference signal is frequency modulated.

30. The communication system according to claim 29, wherein said modulation law is applied on two channels in quadrature, two separate functions being used for each of said two channels.

31. The communication system according to claim 29, wherein said Doppler shift estimating device comprises:

a local oscillator generating a local oscillator output signal, a mixer receiving said received carrier signal and said local oscillator output signal and producing a mixer output signal, wherein said received carrier signal includes said signalling packet, a filter receiving said mixer output signal and producing a signal of intermediate frequency, an analyzer circuit receiving said signal of intermediate frequency and producing a shift signal representing a Doppler effect frequency shift between a theoretical frequency and said intermediate frequency, said shift signal having a shift signal frequency, and a control circuit controlling said local oscillator to establish an estimate of said Doppler shift from said shift signal.

32. The communication device according to claim 31, wherein said control circuit controls said local oscillator also to reduce said frequency shift.

33. The communication device according to claim 31, wherein:

said analyzer circuit comprises:
a first filter having a first center frequency of said theoretical frequency and producing a first filter output signal, and
a corrector circuit producing a first form factor of said first filter output signal, and
said control circuit controls said local oscillator to maximize said first form factor.

34. The communication system according to claim 33, wherein said control circuit performs said control of said local oscillator by successive approximation, applying a frequency correction on either side of a frequency that produces a greatest form factor to search again for said greatest form factor, successive searches being conducted by reducing values of said frequency correction as far as a predetermined correction threshold.

35. The communication system according to claim 34, wherein:

a shift amplitude has a value substantially equal to a maximum Doppler shift of said signal of intermediate frequency, said analyzer circuit further comprises a second filter and a third filter, said second filter has a second center frequency of said theoretical frequency decreased by said shift amplitude, and produces a second filter output signal, said third filter has a third center frequency of said theoretical frequency increased by said shift amplitude, and produces a third filter output signal, said corrector circuit produces a second form factor of said second filter output signal and produces a third form factor of said third filter output signal, a barycenter is defined based on said first center frequency weighted by said first form factor, said second center frequency weighted by said second form factor, and said third center frequency weighted by said third form factor, and said corrector circuit produces said shift signal proportional to an opposite of said barycenter.

36. The communication system according to claim 35, wherein said control circuit controls said local oscillator so that said intermediate frequency is increased by said shift signal frequency.

37. The communication system according to claim 11, wherein said synchronizing device comprises:

a local oscillator generating a local oscillator output signal, a mixer receiving said received carrier signal and said local oscillator output signal and producing a mixer output signal, wherein said received carrier signal includes said signalling packet, a filter receiving said mixer output signal and producing a signal of intermediate frequency, an analyzer circuit receiving said signal of intermediate frequency and producing a frequency shift signal representing a time interval between reception of two of said successive signalling packets, and a control circuit responsive to said change frequency signal to control said local oscillator to reduce a shift between said frequency shift signal and said repetition period $T_r$.

38. A terminal of a mobile radio installation, comprising:

a receiver adapted to receive a signalling packet that comprises a frequency modulated reference signal modulated in accordance with a modulation law, said modulation law being a predetermined linear function varying with time within said signalling packet, said modulation law being applied on two channels in quadrature, two separate functions being used for each of said two channels, said packet defining a FCCHd burst with a burst start and a burst end, said two channels including an I channel and a Q channel;

means for acquiring N samples on said two channels, said N samples including $s_I(t)$ samples of said I channel and $s_Q(t)$ samples of said Q channel where t is a time representation, there being an instantaneous frequency $f_I$ of said I channel and an instantaneous frequency $f_Q$ of said Q channel at each of said N samples;

means for storing said N samples;

means for producing a set of products $s_I(kT) \cdot s_Q(kT)$, where kT is a discrete time representation;

means for storing said set of products;

a digital low-pass filter eliminating a highest frequency component from each of said set of products, thereby providing a filtered signal;

means for performing spectrum analysis of said filtered signal to determine a difference $f_\tau$ between $f_I$ and $f_Q$ at a time of said acquiring;

means for calculating a time interval $\tau$ between said burst start of said FCCHd burst and a start of said acquiring of said N samples, based on a known duration $T_B$ of said FCCHd burst, on said instantaneous frequency $f_I$ at said burst end, and on said instantaneous frequency $f_Q$ at said burst end, said means for calculating using the equation:

$$\tau = TB \cdot \frac{f_\tau}{2(f_I - f_Q)}$$

where $f_\tau$ is determined by spectrum analysis and where $f_I$ is assumed to be greater than $f_Q$; and means for synchronizing said terminal to said burst start.

39. The terminal according to claim 38, further comprising:

means for determining an absolute value of a Doppler shift d by acquiring a complete FCCHd burst on one of said two channels of said receiver by storing samples, and for processing said samples of said complete FCCHd burst to retain only a term $2\pi dt$ to which is added a phase term $\phi$ to provide a processed signal, and for carrying out spectrum analysis said processed signal to said absolute value of said Doppler shift; and means for determining a sign of said Doppler shift based on a calculation of two Doppler shifts.

40. The terminal according to claim 39, further comprising means for compensating for said Doppler frequency shift using a local oscillator having a frequency which is based on a fixed demodulation frequency adjusted to compensate for said Doppler shift.

41. The terminal according to claim 40, further comprising a logical device for automatically tracking said Doppler shift according to a known satellite displacement a set of measurements of said Doppler shift.

42. The terminal according to claim 41, wherein:

said logic unit includes a logic unit memory storing a table of known time variations of said Doppler shift for different maximal satellite elevations;

said terminal makes and stores in a volatile memory a series of measurements of said Doppler shift and compares said measurements with said table to determine a Doppler shift variation curve to be used; and said terminal further comprises another calculation unit for predicting a Doppler shift correction voltage based on said Doppler shift variation curve, said local oscillator being supplied with a voltage determined from said Doppler shift correction voltage.

43. A transmitter of a base station of a mobile radio installation, the transmitter comprising:

means for producing a reference signal;

means for frequency modulating said reference signal in accordance with a modulation law;

means for including said reference signal in a signalling packet; and means for transmitting said signalling packet;

wherein said modulation law is a predetermined linear function varying with time within said signalling packet.

* * * * *